US010466068B2

(12) United States Patent
Hodjat-Shamami et al.

(10) Patent No.: US 10,466,068 B2
(45) Date of Patent: Nov. 5, 2019

(54) SYSTEMS AND METHODS FOR OPERATION OF VIBRATORY GYROSCOPES

(71) Applicant: Georgia Tech Research Corporation, Atlanta, GA (US)

(72) Inventors: Mojtaba Hodjat-Shamami, Atlanta, GA (US); Farrokh Ayazi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 64 days.

(21) Appl. No.: 15/877,099

(22) Filed: Jan. 22, 2018

(65) Prior Publication Data

US 2018/0209816 A1 Jul. 26, 2018

Related U.S. Application Data

(60) Provisional application No. 62/449,472, filed on Jan. 23, 2017.

(51) Int. Cl.
*G01C 25/00* (2006.01)
*G01C 19/5776* (2012.01)
*G01C 19/5684* (2012.01)

(52) U.S. Cl.
CPC ....... *G01C 25/005* (2013.01); *G01C 19/5684* (2013.01); *G01C 19/5776* (2013.01)

(58) Field of Classification Search
CPC .. G01C 25/005; G01C 25/00; G01C 19/5684; G01C 19/5776
See application file for complete search history.

(56) References Cited

U.S. PATENT DOCUMENTS

| 8,117,913 | B2 * | 2/2012 | Terada | G01C 19/5726 |
| | | | | 73/504.12 |
| 10,191,079 | B2 * | 1/2019 | Shirazi | G01P 21/00 |
| 2003/0101814 | A1 * | 6/2003 | Challoner | G01C 19/5719 |
| | | | | 73/504.12 |

* cited by examiner

*Primary Examiner* — David Z Huang
(74) *Attorney, Agent, or Firm* — Troutman Sanders LLP; Ryan A. Schneider (57) ABSTRACT

Embodiments of the present disclosure can include a method of operating a vibratory gyroscope, the gyroscope comprising a plurality of excitation and readout electrodes, and defined by a first vibratory mode and a second vibratory mode, and the method comprising: introducing an input signal to a first pair of excitation electrodes; multiplying the input signal by scaling coefficients; applying these scaled input signals to a first pair of excitation electrodes; measuring output signals at the first and second pair of readout electrodes that correspond to the first and second vibratory modes respectively; multiplying the output signals by readout scaling coefficients to form scaled output signals, the sums of which provide first and second vibratory mode readout signals; and adjusting the scaling coefficients to maximize the first and minimize the second vibratory mode readout signals.

18 Claims, 9 Drawing Sheets

SYSTEMS AND METHODS FOR OPERATION OF VIBRATORY GYROSCOPES

CROSS-REFERENCE TO RELATED APPLICATIONS

This application, filed Jan. 22, 2018, claims the benefit of U.S. Provisional Patent Application No. 62/449,472, filed Jan. 23, 2017, entitled "Eigenmode Operation of Vibratory Gyroscopes," the entire contents and substance of which are hereby incorporated by reference as if fully set forth below.

STATEMENT OF FEDERALLY SPONSORED RESEARCH

This invention was made with government support under Contract No. N66001-11-C-4176 awarded by U.S. Navy Space and Naval Warfare Systems Command. The government has certain rights in the invention.

BACKGROUND

Resonant MEMS gyroscopes operate based on the transfer of energy between two vibration modes of the device due to Coriolis effect. The device is excited at the resonance frequency of the primary drive mode, and the rate-proportional Coriolis-induced signal is picked off along the secondary sense mode. If the resonance frequency of the sense mode matches that of the drive mode, the mechanical Q-amplification of the sense signal significantly improves the overall signal-to-noise ratio and relaxes the specification requirements of the interface circuitry. High performance of a gyroscope can be ensured through mode-matched operation of a gyroscope.

BRIEF SUMMARY

Embodiments of the present disclosure can include a method for operating a vibratory gyroscope, the gyroscope comprising a plurality of excitation and readout electrodes, and defined by a first vibratory mode and a second vibratory mode, the method comprising: introducing an input signal to a first pair of excitation electrodes; multiplying the input signal by a first excitation scaling coefficient and a second excitation scaling coefficient to generate a first scaled input signal and a second scaled input signal; applying respectively the first scaled input signal and the second scaled input signal to a first excitation electrode and a second excitation electrode of the first pair of excitation electrodes; measuring a first output signal and a second output signal at a first pair of readout electrodes and a third output signal and a fourth output signal at a second pair of readout electrodes, the first pair of readout electrodes corresponding to the first vibratory mode and the second pair of readout electrodes corresponding to the second vibratory mode; multiplying the first output signal and the third output signal by a first readout scaling coefficient to form a first scaled output signal and a third scaled output signal and further multiplying the second output signal and the fourth output signal by a second readout scaling coefficient to form a second scaled output signal and a fourth scaled output signal, the sum of the first and second scaled output signals being a first vibratory mode readout signal and the sum of the third and fourth scaled output signals being a second vibratory mode readout signal; and adjusting the excitation and readout scaling coefficients to maximize the first vibratory mode readout signal and minimize the second vibratory mode readout signal.

In some embodiments, the gyroscope can comprise an annulus suspended by a plurality of suspension beams. In some embodiments, the plurality of excitation and readout electrodes can be disposed on the annulus. In some embodiments, the gyroscope can further comprise a plurality of fixed electrodes disposed about a perimeter of the annulus and in communication with the plurality of excitation and readout electrodes.

In some embodiments, the first pair of excitation electrodes, the first pair of readout electrodes, and the second pair of readout electrodes can be separated by an angle determined based on a shape of the first vibratory mode. In some embodiments, the angle can be from about 15 to about 45 degrees. In some embodiments, the angle can be about 22.5 degrees.

In some embodiments, selecting the position of the excitation and readout electrode pairs about the gyroscope can further comprise selecting the position of the excitation and readout electrode pairs based on a shape of the first vibratory mode and the second vibratory mode.

In some embodiments, the first vibratory mode and the second vibratory mode can be misaligned with respect to the plurality of excitation and readout electrodes.

In some embodiments, the first vibratory mode and the second vibratory mode can be substantially orthogonal.

In some embodiments, the first vibratory mode can be characterized by a first vibratory frequency and the second vibratory mode can be characterized by a second vibratory frequency.

In some embodiments, the drive readout signal can be proportional to a velocity of vibration of the gyroscope.

In some embodiments, the first excitation and readout scaling coefficients can be approximately equal and the second excitation and readout scaling coefficients can be approximately equal.

In some embodiments, selecting the excitation electrodes and the readout electrodes can further comprise selecting the excitation and the readout electrodes based on a crystallographic orientation of the substrate.

Embodiments of the present disclosure can include a method of operating a vibratory gyroscope, the gyroscope being in communication with a plurality of excitation electrode pairs and readout electrode pairs disposed on a vibratory body of the gyroscope and defined by a drive mode and a sense mode, the method comprising: generating an excitation signal; splitting the excitation signal into a first input signal and a second input signal; multiplying the first input signal by a first excitation scaling coefficient forming a first scaled input signal and multiplying the second input signal by a second excitation scaling coefficient forming a second scaled input signal; introducing the first scaled input signal at a first excitation electrode and a second excitation electrode of the plurality of excitation electrode pairs; measuring a first output signal and a second output signal at a first pair of readout electrodes and a third output signal and a fourth output signal at a second pair of readout electrodes, the first pair of readout electrodes corresponding to the first vibratory mode and the second pair of readout electrodes corresponding to the second vibratory mode; multiplying the first output signal and the third output signal by a first readout scaling coefficient to form a first scaled output signal and a third scaled output signal and further multiplying the second output signal and the fourth output signal by a second readout scaling coefficient to form a second scaled output signal and a fourth scaled output signal, the sum of the first and second scaled output signals being a first vibratory mode readout signal and the sum of the third and fourth scaled output signals being a second vibratory mode readout signal; and adjusting the excitation and readout scaling coefficients to maximize the drive readout signal and minimize the sense readout signal.

In some embodiments, the gyroscope can comprise an annulus suspended by a plurality of suspension beams, and the plurality of excitation and readout electrodes can be disposed on the annulus. In some embodiments, the gyroscope can further comprise a plurality of fixed electrodes disposed about a perimeter of the annulus and in communication with the plurality of excitation and readout electrodes, the fixed electrodes for introducing the input signal to the first pair of excitation electrodes.

In some embodiments, the first vibratory mode can be characterized by a first vibratory frequency and the second vibratory mode can be characterized by a second vibratory frequency.

In some embodiments, the drive readout signal can be proportional to a velocity of vibration of the gyroscope.

DETAILED DESCRIPTION

Although preferred embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways. Also, in describing the preferred embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Microelectromechanical (MEMS) gyroscopes, such as Coriolis vibratory gyroscopes, can be susceptible to misalignment during manufacturing or use of the gyroscope. Misalignment can occur when the vibratory modes (e.g. the drive and sense modes) of the gyroscope become misaligned with respect to the physical electrodes disposed on a vibratory body of the gyroscope. Misalignment can result in frequency mismatch of the drive and sense modes and in bias signal errors. Bias signal errors can include an output of the gyroscope in the absence of external rotation rate. The bias signal error can generally have two components: the quadrature error caused by stiffness misalignment and the in-phase error caused by damping misalignment. Known methods for modal alignment of gyroscopes correct the modal direction to be aligned with the transduction direction. Embodiments of the present disclosure that implement eigenmode operation instead can correct the transduction direction of the gyroscopes to become aligned with the modal direction using the physical circuitry and electrode configuration already present.

Embodiments of the present disclosure include methods for operating a vibratory gyroscope. In some embodiments, the methods for operating a vibratory gyroscope can allow for modal alignment of gyroscopes that may have misaligned drive and sense modes. This can also be referred to, in some instances, as eigenmode operation. In some embodiments, the methods for operating a vibratory gyroscope can allow for dynamic tuning of a gyroscope. In some embodiments, the methods for operating a vibratory gyroscope can permit mode-matching of a vibratory gyroscope.

Modal alignment through eigenmode operation can be advantageous because it can achieve bias error cancellation (e.g. the in-phase or quadrature-phase bias error due to modal misalignment) without the need for electrostatic transduction, narrow capacitive gaps, or large DC voltages. In-phase and quadrature errors in the bias output of a gyroscope can result from misaligned vibratory modes of the gyroscope. Embodiments of the present disclosure can allow for correcting the direction of excitation by applying the excitation signal to two different electrodes that are spatially apart and picking off the sense signal again using two different electrodes. Because the modal direction is not corrected, there is no need to pre-stress the device by using DC electrostatic transduction. Therefore, the need for narrow capacitive gaps and relatively large DC voltages can be eliminated.

Eigenmode operation can also be advantageous as it preserves electrical isolation of the drive and sense modes of gyroscopes to make sure there is only mechanical coupling between the two modes of the gyroscope. Additionally, eigenmode operation can be applied to gyroscopes that sense rotation about x, y, or z axes and can be applied to mode-matched or mode-split gyroscopes.

Resonant MEMS gyroscopes can operate based on the energy transfer between two vibratory modes of the device due to the Coriolis effect. These two vibratory (or resonance) modes can be the primary drive mode and the secondary sense mode. Both modes can be excited with an excitation signal and read-out with a readout signal. In use, resonant MEMS gyroscopes can be excited at the resonance frequency of the primary drive mode and a rate-proportional Coriolis-induced signal can be picked off along the secondary sense mode. Generally, if the resonance frequency of the sense mode matches that of the drive mode, the mechanical Q-amplification of the sense signal can significantly improve the overall signal-to-noise ratio and relax the specification requirements of the interface circuitry. Ideally, the proportional-to-rate Coriolis force is the only source of coupling between the drive and sense modes of a resonant gyroscope. However, in practice, the misalignment of the natural vibratory modes with respect to the location of the drive and sense electrodes can cause additional undesired coupling between the two resonance modes. This undesired coupling, which causes the bias error in gyroscopes, can be modeled by considering stiffness and damping terms in the drive and sense equations of motion of the gyroscope that cross-couple force and displacement of the two resonance modes.

Additionally, high performance of gyroscopes can be achieved when the drive and sense modes of the gyroscope are mode-matched. Mode matching can occur when the first and second vibration modes are aligned and mutually orthogonal and are tuned to have approximately the same resonant frequency. Mode-matching can impose a constraint on the maximum operation bandwidth of high-Q devices. Capacitive bulk acoustic wave (BAW) gyroscopes can circumvent this problem by increasing the resonance frequency of the device by taking advantage of stiff bulk vibration modes of the structure. The BAW gyroscopes have also proven to offer superior performance with shock and vibration immunity paving the way towards realization of short-range inertial navigation systems.

Thin-film-piezoelectric-on-silicon gyroscopes can achieve large resonant bandwidth and immunity to shock and vibration by using high-frequency degenerate vibration modes of the structure. However, unlike BAW gyroscopes, thin-film-piezoelectric-on-silicon gyroscopes do not need submicron gaps or large DC voltages to achieve electrostatic transduction. However, in such devices, mode matching and alignment is challenging because of the lack of an electrostatic tuning and alignment mechanism. Embodiments of the present disclosure address these and other issues impacting the tuning of any piezoelectric gyroscope.

Figure 1:
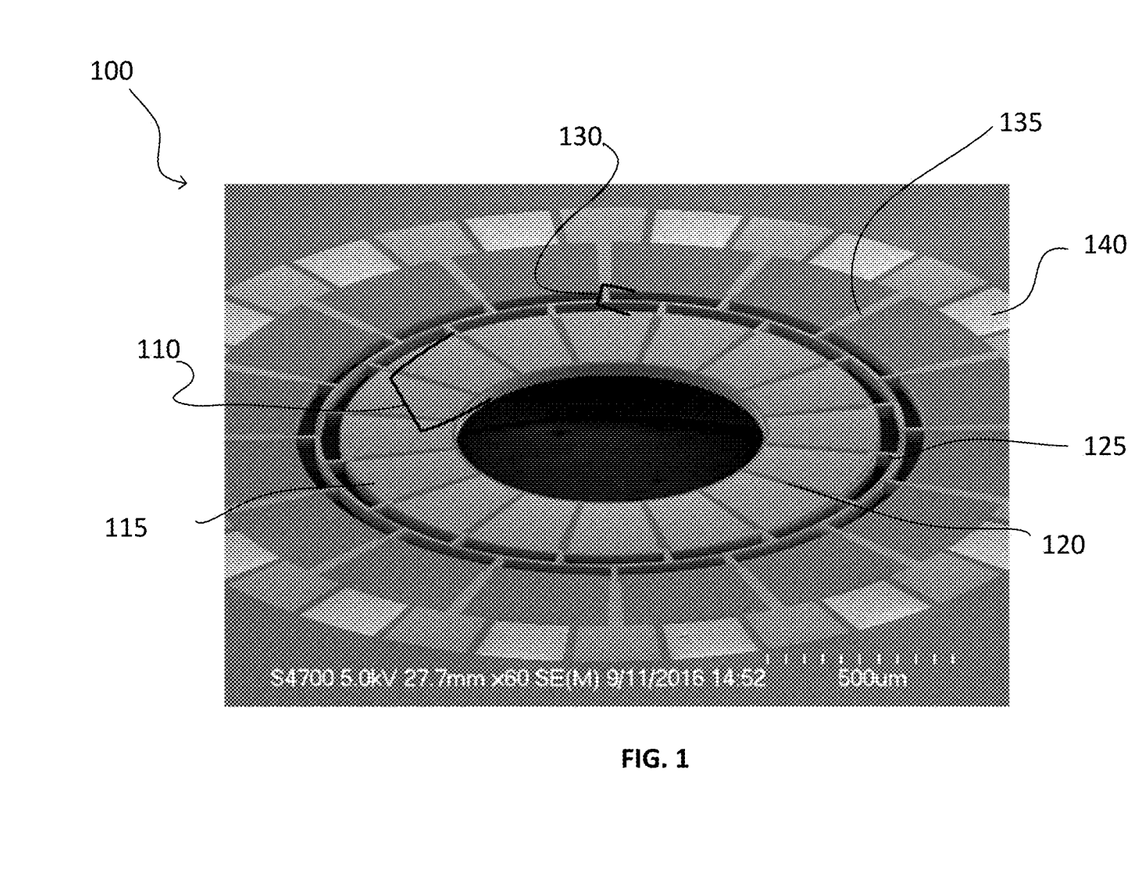
FIG. 1 shows an SEM image of an annular piezoelectric resonant gyroscope, in accordance with one or more embodiments of the present disclosure.

Embodiments of the present disclosure can provide modal alignment to a variety of resonant MEMS gyroscopes, for example and not limited to, Corolis vibratory gyroscopes, piezoelectric gyroscopes, electrostatic gyroscopes, electromagnetic gyroscopes, tuning-fork gyroscopes, disk resonator gyroscopes, square resonator gyroscopes, thin-film-piezoelectric-on-silicon gyroscopes incorporating an annular structure, or bulk acoustic wave gyroscopes. In an exemplary embodiment, as illustrated at FIG. 1, the gyroscope 100 can be an annular structure 110 with a thin-film piezoelectric layer 120. The annular thin-film gyroscope 100 can incorporate an annulus 110 suspended through a support structure 130. In some embodiments, as illustrated in FIG. 1, the support structure can be an annular support structure. However, those skilled in the art would understand that other support structure geometries are available. The annulus can comprise a plurality of electrode layers comprising a plurality of electrodes 115 and a piezoelectric layer. The support structure 130 can include a plurality of suspension beams 125 that enable suspension of the annulus 110. The annulus can be in communication with a plurality of fixed electrodes 140 disposed about an inner or outer perimeter of the annulus. The support structure 130 can be in electrical communication with the plurality of fixed electrodes through a plurality of electrical connectors 135.

Coriolis vibratory gyroscopes can be modeled using a set of two coupled differential equations of motion as given in equation (1) where $q_1$ and $q_2$, and $Q_1$ and $Q_2$ are the generalized coordinates and forces defined in the physical direction of excitation and readout of the gyroscope. m, c, and k are the mass, damping and stiffness coefficients, and $\Omega$ is the rate of rotation about the axis perpendicular to the plane of coordinates.

$$\begin{cases} m\ddot{q}_1 + c_{11}\dot{q}_1 + c_{12}\dot{q}_2 + k_{11}q_1 + k_{12}q_2 - 2m\Omega\dot{q}_2 = Q_1 \\ m\ddot{q}_2 + c_{21}\dot{q}_1 + c_{22}\dot{q}_2 + k_{21}q_1 + k_{22}q_2 + 2m\Omega\dot{q}_1 = Q_2 \end{cases} \quad (1)$$

First, considering the undamped response, in the absence of any external rotation and knowing that the stiffness matrix is symmetric, the equations of motion in the matrix form can be written as follows.

$$\begin{bmatrix} m & 0 \\ 0 & m \end{bmatrix} \begin{Bmatrix} \ddot{q}_1 \\ \ddot{q}_2 \end{Bmatrix} + \begin{bmatrix} k - \Delta k & k_{12} \\ k_{12} & k + \Delta k \end{bmatrix} \begin{Bmatrix} q_1 \\ q_2 \end{Bmatrix} = \begin{Bmatrix} Q_1 \\ Q_2 \end{Bmatrix} \quad (2)$$

The solution to the homogeneous equation will be of the form $\{q\}=\text{Re}[B\{\phi\}e^{j\omega t}]$. Substituting in the homogeneous equation following eigenvalue problem can be ascertained.

$$([K]-\omega^2[M])\{\phi\}=\{0\} \quad (3)$$

Solving the eigenvalue problem results in the following two eigenfrequencies and eigenvectors (eigenmodes).

$$eigenfrequencies: \omega_1 = \sqrt{\frac{k - \sqrt{\Delta k^2 + k_{12}^2}}{m}}, \quad (4)$$

$$\omega_2 = \sqrt{\frac{k + \sqrt{\Delta k^2 + k_{12}^2}}{m}}$$

$$\text{eigenmodes: } \{\phi_1\} = \left\{ \frac{\Delta k - \sqrt[1]{\sqrt{\Delta k^2 + k_{12}^2}}}{k_{12}} \right\}, \quad (5)$$

$$\{\phi_2\} = \left\{ \frac{\Delta k + \sqrt[1]{\sqrt{\Delta k^2 + k_{12}^2}}}{k_{12}} \right\}$$

Equations (4) and (5) give the natural frequencies and vibration modes of the coupled system of equations. The modal masses can be defined as given below.

$$\mu_1 = \{\phi_1\}^T[M]\{\phi_1\}, \mu_2 = \{\phi_2\}^T[M]\{\phi_2\} \quad (6)$$

Next, the eigenvectors can be normalized by the modal masses and define the normal mode matrix as follows.

$$\text{Normal modes: } \{\Phi_1\} = \frac{1}{\sqrt{\mu_1}} \left\{ \frac{\Delta k - \sqrt[1]{\sqrt{\Delta k^2 + k_{12}^2}}}{k_{12}} \right\}, \quad (7)$$

$$\{\phi_2\} = \frac{1}{\sqrt{\mu_2}} \left\{ \frac{\Delta k + \sqrt[1]{\sqrt{\Delta k^2 + k_{12}^2}}}{k_{12}} \right\}$$

Normal mode matrix: $[\Phi] = [\Phi_1 \Phi_2]$ (8)

The normal modes are orthogonal with respect to the mass and stiffness matrices.

$$[\Phi]^T[M][\Phi]=[I], \text{ and } [\Phi]^T[K][\Phi]=[\omega_{nat}^2] \quad (9)$$

Now, the following modal transformation can be considered.

$$\{q\}=[\Phi]\{\eta\} \quad (10)$$

The equations of motion under the above linear transformation become as given below.

$$[M][\Phi]\{\ddot{\eta}\}+[K][\Phi]\{\eta\}=\{Q\} \quad (11)$$

Pre-multiplying the above equation and using the orthogonality properties can result in the diagonalization of the mass and stiffness matrices and hence can remove the coupling between the two equations.

$$\{\ddot{\eta}\}+[\omega_{nat}^2]\{\eta\}=[\Phi]^T\{Q\} \quad (12)$$

Eigenmode operation of vibratory gyroscopes can take advantage of the fact that Equation (12) represents two uncoupled differential equations. The only reason for the appearance of zero-rate output in the response of resonant gyroscopes is the existence of off-diagonal terms which cause coupling of the two vibratory modes. Equation (12) represents a new set of generalized coordinates (modal coordinates) along which there is no cross-coupling between the two modes of the gyroscope. The transformation from $\{q\}$ to $\{\eta\}$ is via the transpose of the modal matrix, $[\Phi]^T$. In essence, $[\Phi]^T$ represents a rotation transformation, which means that there exists a direction in the plane of the original generalized coordinates along which the two modes of the gyroscope are uncoupled. The desired forcing vector is $[\Phi]^T\{Q\}$ and the desired readout vector is $\{\eta\}=[\Phi]^T\{q\}$ which means that both the excitation and readout directions must rotate by the $[\Phi]^T$ matrix.

If the damping matrix is proportional to the mass and stiffness matrices, $[C]=\beta[M]+\gamma[K]$, the same transformation using the normal mode matrix can result in the diagonalization of the damping matrix which means that the equations of motion will still be uncoupled and eigenmode operation of the presently disclosed systems and methods using the same scaling factors can remove the zero-rate output as derived below.

$$[\Phi]^T[M][\Phi]\{\ddot{\eta}\}+[\Phi]^T(\beta[M]+\gamma[K])[\Phi]\{\dot{\eta}\}+[\Phi]^T[K][\Phi]\{\eta\}=[\Phi]^T\{Q\} \quad (13)$$

$$\{\ddot{\eta}\}+(\beta+\gamma[\omega_{nat}^2])\{\dot{\eta}\}+[\omega_{nat}^2]\{\eta\}=[\Phi]^T\{Q\} \quad (14)$$

Because of the symmetry of resonant gyroscopes, it may be acceptable to assume that even if the damping matrix is not exactly proportional to the mass and stiffness matrices, it is approximately proportional to those matrices. It should be noted that the coupling caused by the cross-damping is generally about 90 degrees apart from that caused by the off-diagonal stiffness terms. Off-diagonal damping terms can result in a residual coupled signal which is in-phase with the sense signal due to the external rotation under mode-matched conditions. For the same reason, compensation of this term is not possible without affecting the response of the gyroscope to the rate signal. Measurement results show that the total magnitude of the zero-rate output can decrease as the effective direction of transduction approaches the eigenmode direction, which suggests the damping matrix is either almost proportional to the mass and stiffness matrices or the off-diagonal terms of the damping matrix are very small.

Embodiments of the present disclosure can achieve cancellation of cross-coupling terms (also known as the quadrature or bias error) through eigenmode operation. In some embodiments, methods of operating a vibratory gyroscope can include introducing an input signal to a first pair of excitation electrodes; multiplying the input signal by a first excitation scaling coefficient and a second excitation scaling coefficient to generate a first scaled input signal and a second scaled input signal; applying respectively the first scaled input signal and the second scaled input signal to a first excitation electrode and a second excitation electrode of the first pair of excitation electrodes; measuring a first output signal and a second output signal at a first pair of readout electrodes and a third output signal and a fourth output signal at a second pair of readout electrodes, the first pair of readout electrodes corresponding to the first vibratory mode and the second pair of readout electrodes corresponding to the second vibratory mode; multiplying the first output signal and the third output signal by a first readout scaling coefficient to form a first scaled output signal and a third scaled output signal and further multiplying the second output signal and the fourth output signal by a second readout scaling coefficient to form a second scaled output signal and a fourth scaled output signal, the sum of the first and second scaled output signals being a first vibratory mode readout signal and the sum of the third and fourth scaled output signals being a second vibratory mode readout signal; and adjusting the excitation and readout scaling coefficients to maximize the drive readout signal and minimize or eliminate the sense readout signal.

In some embodiments, the first excitation scaling coefficient and the first readout scaling coefficient can be approximately equal. In some embodiments, the second excitation scaling coefficient and the second readout scaling coefficient can be approximately equal.

In some embodiments, the methods for operating a vibratory gyroscope can include generating an input signal. Those skilled in the art would understand that the input signal can be generated by a variety of known devices and methods and that the input signal can be initially applied at a plurality of fixed electrodes that operate as an interface between outside circuitry and the vibratory gyroscope.

Figure 2A:
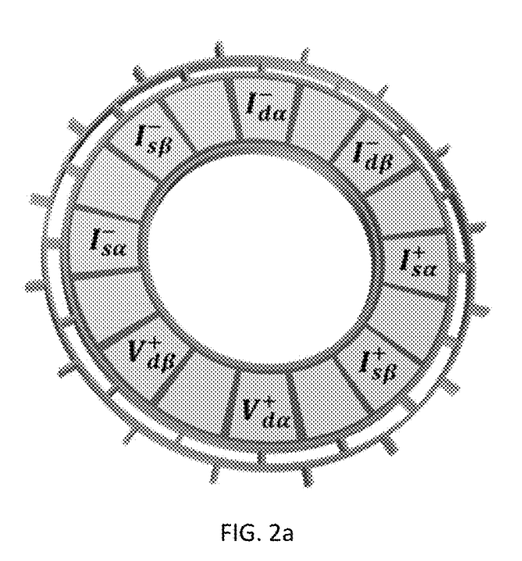
FIG. 2a shows a schematic view of the annulus gyroscope with drive and sense signaling required for eigenmode operation, in accordance with one or more embodiments of the present disclosure.

In some embodiments, the vibratory gyroscope can comprise a plurality of excitation electrode pairs and a plurality of readout electrode pairs. The number of excitation electrode pairs and readout electrode pairs can be determined based on device design or parameters. In some embodiments, the presently disclosed methods can comprise selecting a first excitation electrode pair and a first readout electrode pair. The excitation electrode pair and the readout electrode pair can span the 2D subspace of the gyroscope. For instance, FIG. 2a shows a schematic view of an annulus gyroscope with drive ($V^+_{d\alpha}$, $V^+_{d\beta}$, $I^-_{d\alpha}$, $I^-_{d\beta}$) and sense electrodes ($I^+_{s\alpha}$, $I^+_{s\beta}$, $I^-_{s\alpha}$, $I^-_{s\beta}$). In some embodiments, these electrodes can be selected based on the vibration mode shape of the gyroscope. In some embodiments, the vibration mode shape can be separated by 90 degrees. In other embodiments, the vibration mode shapes can be separated by, for instance, from 10 to 90 degrees, about 11.25, about 13, about 15, about 18, about 22.5, about 30 or about 45 degrees, about 50, about 60, about 75, or about 80 degrees.

Figure 2B:
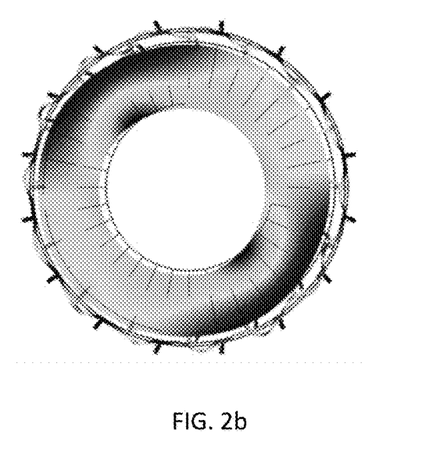
FIGS. 2b and 2c illustrate the modal shape of a drive and sense mode pair of a vibratory gyroscope, in accordance with one or more embodiments of the present disclosure.
Figure 2C:
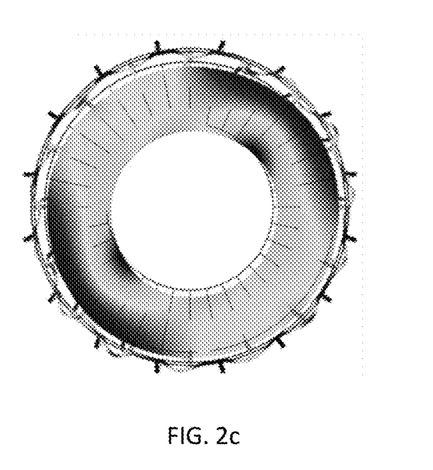

FIGS. 2b and 2c illustrate a drive mode shape (FIG. 2b) and a sense mode shape (FIG. 2c), in accordance with an exemplary embodiment of the present disclosure. In some embodiments, these electrodes can be selected based on the crystallographic orientation of the substrate material. For instance, in single-crystal-silicon (SCS) substrates the <100> and <110> directions can be used as the direction of excitation and readout electrodes. When selecting electrodes based on crystallographic orientation, electrodes locations can be chosen symmetrically around the crystal directions. For instance, assuming the <110> direction is along the x and y axes, in some embodiments, the location of electrodes can be along the following angles (−22.5°, 22.5°, 67.5°, and 112.5°), as shown at FIG. 2a. In some embodiments, the electrodes can be separated by an angle from 15 degrees to about 45 degrees. In some embodiments, the angle can be about 15 degrees, about 20 degrees, about 22.5 degrees, about 25 degrees, about 30 degrees, about 35 degrees, about 40 degrees, and about 45 degrees. In some embodiments, the angle can be as high as 90 degrees, and therefore be about 50 degrees, about 60 degrees, about 75 degrees, about 80 degrees, or about 90 degrees.

Figure 3A:
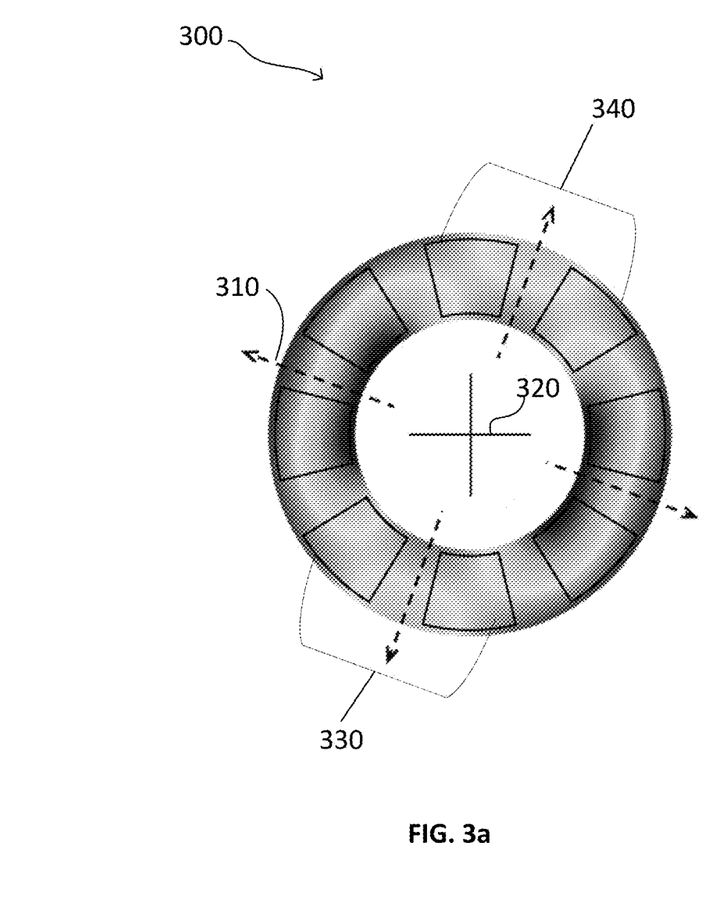
FIGS. 3a and 3b are schematic illustrations of eigenmode operation of an annular gyroscope, in accordance with one or more embodiments of the present disclosure.
Figure 3B:
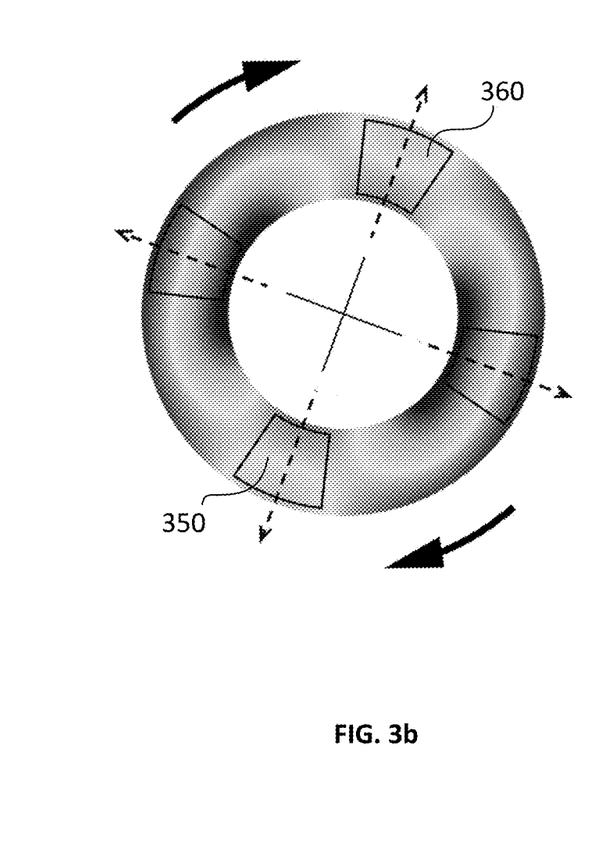

FIGS. 3a and 3b show a schematic illustration of the eigenmode operation of a gyroscope 300, in accordance with one or more embodiments of the present disclosure. FIG. 3a shows the physical location of electrodes. As illustrated in FIGS. 3a and 3b the natural vibration modes 310 (dashed lines) can be misaligned with respect to the electrodes 320 (direction indicated by solid lines) already fabricated in the device. FIG. 3b shows the creation of virtual electrode pairs (350, 360) that can be created through eigenmode operation as described herein. By applying scaling factors to electrode pairs (330, 340) that are spatially apart, the location of the effective excitation and readout electrodes (350 and 360) can be virtually controlled to align them with the eigenmodes (dashed lines), as illustrated in FIG. 3b.

An excitation signal can be applied to each electrode of a first pair of electrodes. The excitation signal applied to each electrode can be represented by a vector having a magnitude and direction. The summation of the signals applied to the first pair of electrodes can be a resultant excitation vector that also has a magnitude and direction. By applying scaling coefficients ±α and ±(1−α) to the transduction of the two electrodes, the magnitude and direction of the two electrodes can be adjusted. In other words, the scaling coefficient can represent the weighing of the excitation signals (or readout signals) applied to the pair of electrodes. In some embodiments, the scaling coefficient (α) can be between 0 and 1 and can be swept from 0 to 1. In some embodiments, α can be within a range of values that exceeds 1. In some embodiments, the scaling coefficients can be applied to both the input signal applied to the excitation electrodes and the output signal generated at the readout electrodes.

In some embodiments, the scaling factor can be normalized with respect to the magnitude of the resultant excitation vector. Thus, as the signals applied to the first pair of electrodes are scaled, only the direction of the resultant excitation vector can be affected, thus creating a virtual electrode and electronically controlling its effective location. In turn, adjusting the value of the scaling coefficient (α), can result in the sense mode response being minimized, and the drive and sense frequencies being equal, thus resulting in the alignment of the effective direction of transduction to the eigenmodes (as shown, for example, in FIGS. 3a and 3b), and thus cancelling the bias error.

Figure 4:
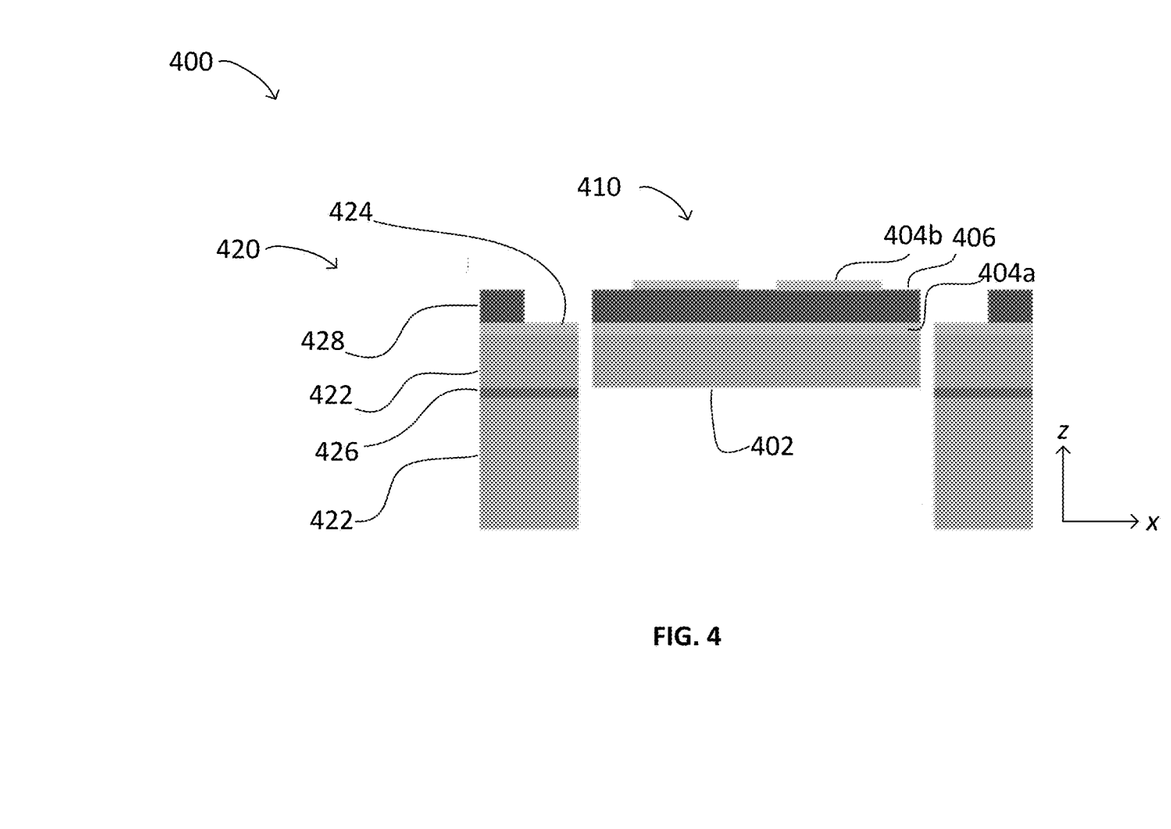
FIG. 4 shows a cross-sectional view of the structure of the suspended annulus and the supporting structure, in accordance with one or more embodiments of the present disclosure.

In some embodiments, the gyroscope can be an annular gyroscope comprising an annulus in electrical communication with a plurality of fixed electrodes disposed about an inner or outer perimeter of the annulus. As described above with respect to FIG. 1, the annulus structure can be suspended above the substrate and coupled to the electrode by multiple suspension beams for structural support and electrical signal transmission to the fixed electrodes. FIG. 4 shows a cross-sectional view of an annulus gyroscope 400. In some embodiments, as illustrated at FIG. 4, the annulus 410 can include a substrate 402, electrode layers 404a, 404b, and a thin-film layer 406. In some embodiments, as illustrated at FIG. 4, the electrode layers 404a, 404b and thin-film layer 406 can be layered on top of the substrate 402 with the thin-film layer 406 disposed between the electrode layers 404a, 404b. In some embodiments, the substrate 402 can be composed of silicon, the thin-film layer 406 can be composed of aluminum nitride and the electrode layers 404a, 404b can be composed of molybdenum. However, those skilled in the art would understand that there are a variety of materials that can be used for fabrication of the annulus. In other embodiments, the thin-film layer 406 can be composed of a variety of materials known to those skilled in the art.

FIG. 4 further shows the structure of the supporting structure 420. The supporting structure 420 can include a substrate 422, an electrode layer 424, a first thin-film layer 426 and a second thin-film layer 428. As illustrated in FIG. 4, the first thin-film layer 426 can be disposed within the substrate 422, and the second thin-film layer 428 and the electrode layer 424 can be layered on top of the substrate with the second thin-film layer 428 layered over the electrode layer 424. The second thin-film layer 428 can be aligned with the thin-film layer 406 of the annulus 410, and the electrode layer 424 can be aligned with the bottom-most electrode layer 404a of the annulus structure 410. In some embodiments, the supporting structure 420 can include an additional electrode layer disposed above the second thin-film layer 428. In some embodiments, the substrate 422 can be composed of silicon, the first thin-film layer 426 can be a buried oxide film, the electrode layer can be composed of molybdenum, and the second thin-film layer 428 can be composed of aluminum nitride. However, those skilled in the art would understand that there are a variety of materials that can be used for fabrication of the annulus. For example and not limited to the following, the thin-film layer can be composed of aluminum nitride, zinc oxide, lead zirconate titanate, lithium niobate, or barium titanate. Additionally, in some embodiments, the device structure can be a piezoelectric layer on substrate. Further, in some embodiments, the electrodes are not split in the radial direction. For instance, as illustrated in FIG. 2a, they can be split in the tangential or azimuthal direction. Further in some embodiments, the width of the annulus can be larger than its thickness.

In some embodiments, the above-described methods for eigenmode operation can be used for mode-matching the modes of a gyroscope. Mode matching can include alignment of the two modes of the gyroscope (removing the off-diagonal terms) and matching the resonant frequency of the two modes (matching the diagonal terms). The zero-rate output due to off-diagonal stiffness, $k_{12}$, and damping, $c_{12}$, terms are 90 degrees apart and their total effect is again phase shifted by the transfer function of the sense mode before appearing at the sense output. For instance, in an example embodiment, mode matching can be performed with I/Q demodulator at the output of the gyroscope.

In some embodiments, the first vibratory mode can be characterized by a first vibratory frequency and the second vibratory mode can be characterized by a second vibratory frequency. In some embodiments, methods for mode-matching can further comprise integrating a readout signal related to the first vibratory mode to extract a displacement signal; multiplying the displacement signal with an integration scaling coefficient to generate a scaled displacement signal; and adding the scaled displacement signal to the input signal. In some embodiments, the integration scaling coefficient is set such that the first vibratory frequency and the second vibratory frequency are substantially equal. The readout signal can be proportional to a velocity of vibration of the gyroscope.

Figure 5:
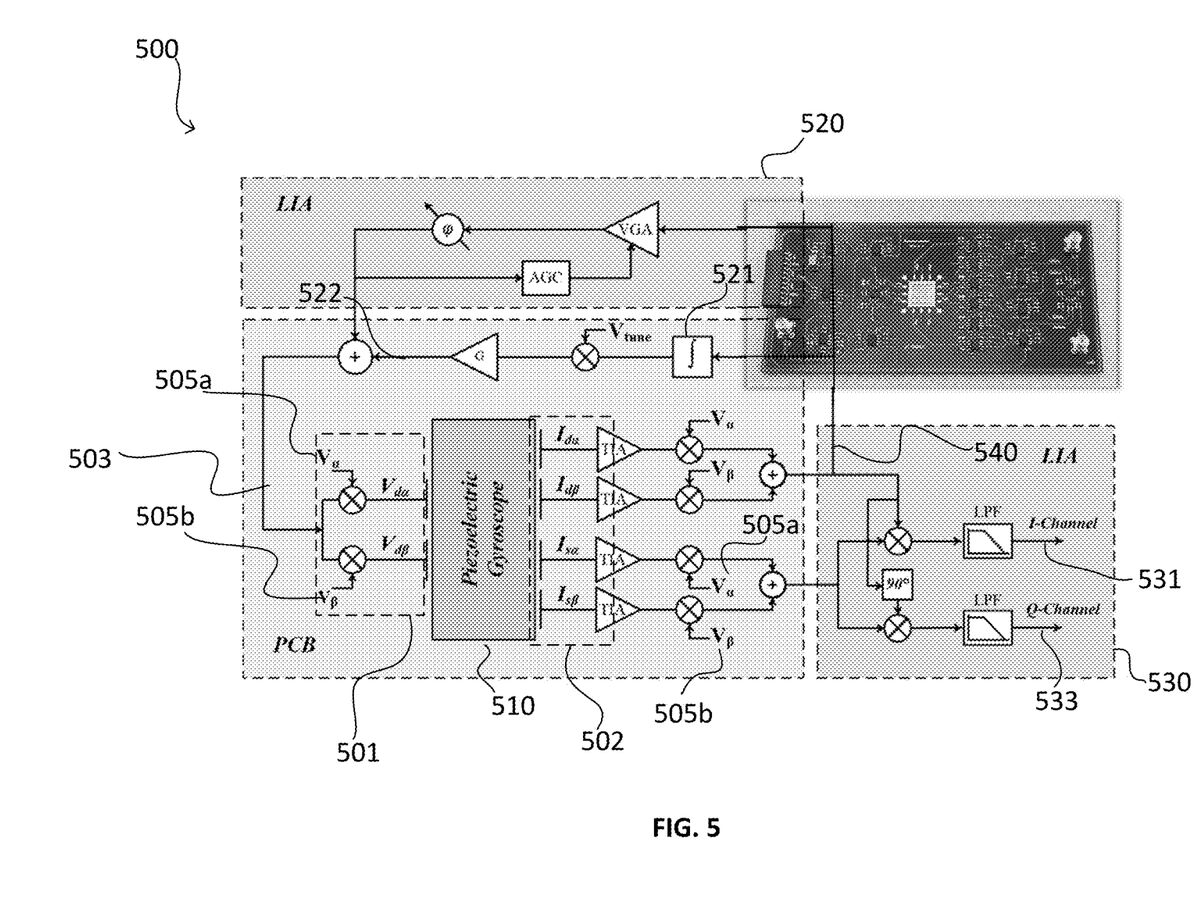
FIG. 5 is a schematic showing the interface architecture for eigenmode operation.

FIG. 5 illustrates an exemplary interface architecture 500 for modal alignment including eigenmode operation and frequency-matching, in accordance with one or more embodiments of the present disclosure. The interface architecture 500 incorporates an I/Q demodulator 530 by which mode matching can be performed by adjusting the scaling factor to align the modes (e.g. eigenmode operation) and a feedback loop to account for the displacement feedback of the excitation signal to reduce the sense output and match the drive and sense frequencies. 501 shows an input architecture for providing a first input signal and a second input signal to the gyroscope 510. In some embodiments, as illustrated in FIG. 5, a primary input signal 503 can be received from a lock-in amplifier 510. The primary input signal 503 can be split into a first input signal and a second input signal which can be multiplied by a first scaling coefficient 505a and a second scaling coefficient 505b. In some embodiments, the first scaling coefficient 505a and the second scaling coefficient 505b are pre-determined using the above-described methods. In some embodiments, the first scaling coefficient 505a and the second scaling coefficient 505b are arbitrarily assigned as 1 or 0 and adjusted. In some embodiments, the first scaling coefficient 505a and the second scaling coefficient 505b can be adjusted based on readings ascertained from the I/Q demodulator 530 to cancel a bias error.

FIG. 5 further shows a plurality of readout signals 502 that can be fed into the I/Q demodulator and also adjusted by the first and second scaling coefficients as described above. For instance, FIG. 5 shows a pair of drive readout signals ($I_{d\alpha}$, $I_{d\beta}$) and a pair of sense readout signals ($I_{s\alpha}$, $I_{s\beta}$). Each signal of the pair of drive readout signals and the pair of sense readout signals can be multiplied by the first scaling coefficient 505a and the second scaling coefficient 505b respectively.

The I/Q demodulator 530 can have an I-channel 531 and a Q-channel 533 where the I-channel provides the in-phase demodulated signal and the Q-channel provides the quadrature-phase demodulated signal. The scaling coefficients can be adjusted such that the I-channel signal containing the drive readout signal is maximized and the Q-channel signal containing the sense readout signal is minimized. The scaling coefficients can be adjusted such that the bias error of the gyroscope is minimized.

FIG. 5 further shows a feedback loop for providing frequency matching including an integrator 521 that can be used to integrate the drive readout signal 540 obtained from the gyroscope to extract a displacement feedback signal. This displacement feedback signal 522 can be used to adjust the primary input signal 503. In some embodiments, the primary input signal 503 can be adjusted by adding the displacement feedback signal 522 to the primary input signal 503, as illustrated at FIG. 5.

In some embodiments, modal alignment and frequency-matching can be achieved using a frequency sweeper. In some embodiments, without access to a frequency sweeper, an initial estimate of the scaling coefficient and tuning gain can be made. As explained previously, the scaling coefficients determine the weighting of the excitation (or readout) signals applied to two different electrodes. The frequency displacement can be used for frequency matching to match the vibration frequency of the two modes. In some embodiments, the frequency displacement can be ascertained by extracting a displacement signal of the drive mode and feeding it back to the input excitation signals of the gyroscope using a feedback loop 520. The output signal of the drive mode of the gyroscope 510 is proportional to the velocity of vibration. By integrating the signal 521, the displacement signal can be obtained and fed back into the input excitation signal 505 by adding it to the excitation signal.

After adjusting the scaling coefficients and the displacement feedback, the demodulation angle can be adjusted to have the rate output appear mostly in the I-channel 531 only. Following, the scaling coefficients can be adjusted to minimize the sense I and Q (531, 533) channel outputs and frequency tuning the signal to maximize the sense I-channel (531) output. Following, the demodulation angle can be adjusted again until the Q-channel 533 signal is almost zero and there is only a residual I-channel 531 signal caused by cross-damping terms. At this point, the phase shift due to the sense mode dynamics can be eliminated because the drive and sense frequencies are matched.

EXAMPLES

The present disclosed technology is also described and demonstrated by way of the following example. However, the use of these and other examples anywhere in the specification is illustrative only and in no way limits the scope and meaning of the disclosure or of any exemplified term. Likewise, the disclosure is not limited to any particular preferred embodiments described here. Indeed, many modifications and variations of the disclosure may be apparent to those skilled in the art upon reading this specification, and such variations can be made without departing from the disclosure in spirit or in scope. The disclosure is therefore to be limited only by the terms of the appended claims along with the full scope of equivalents to which those claims are entitled.

Example 1

The device is comprised of a 1.3 μm thin film of AlN deposited in between 50 nm top and bottom molybdenum (Mo) electrode layers and stacked on top of a 35 µm thick (100) silicon structural layer. The annulus structure has an outer radius of 700 µm and inner radius of 400 µm and is anchored to the substrate through a network of 32 circularly symmetric T-supports to ensure structural symmetry of the drive and sense modes. The support structure is also used for routing the electrical signals to the metal electrodes attached to the structure.

The device is transduced using 16 identical top electrodes. The bottom Mo layer is used as common terminal between input and output ports. Because of the specific configuration of the interfacing technique, pairs of adjacent Mo electrodes are connected together to form an 8-terminal device. To implement eigenmode operation terminals that are spatially 45° apart are used for excitation and readout of the gyroscope signals. The device was fabricated using a simple 4-mask process such as that described in W. Pan and F. Ayazi, "Thin-film piezoelectric-on-substrate resonators with Q enhancement and TCF reduction," *Micro Electro Mechanical Systems (MEMS), IEEE 23$^{rd}$ International Conference on*, Wanchai, Hong Kong, 2010, pp. 727-730. The pair of in-plane flexural gyroscopic mode shapes is shown in FIGS. 2b and 2c. The orthogonality of the two mode shapes provides a means for detection of Coriolis-induced signal for measurement of angular rate of rotation and the efficient transduction of this particular mode shape ensures low motional resistance, large scaling coefficient and low level of mechanical noise of the device.

Eigenmode operation circuitry for the piezoelectric annulus gyroscope was implemented on a printed circuit board, and the device was interfaced with a lock-in amplifier to realize the drive loop and sense channel. The excitation electrodes of the gyroscope were scaled using two input multipliers to apply the coefficients of $\alpha$ and $1-\alpha$ with proper normalization factors. The same scaling factors were used to scale the drive output and the differential sense output signals to generate the effective drive and sense currents from the pickoff electrodes. The effective drive current is used in a feedback loop after integration to provide the displacement signal necessary for dynamic frequency tuning. The level of frequency tuning is adjusted by an external signal to control the amplitude of the displacement feedback.

Figure 6:
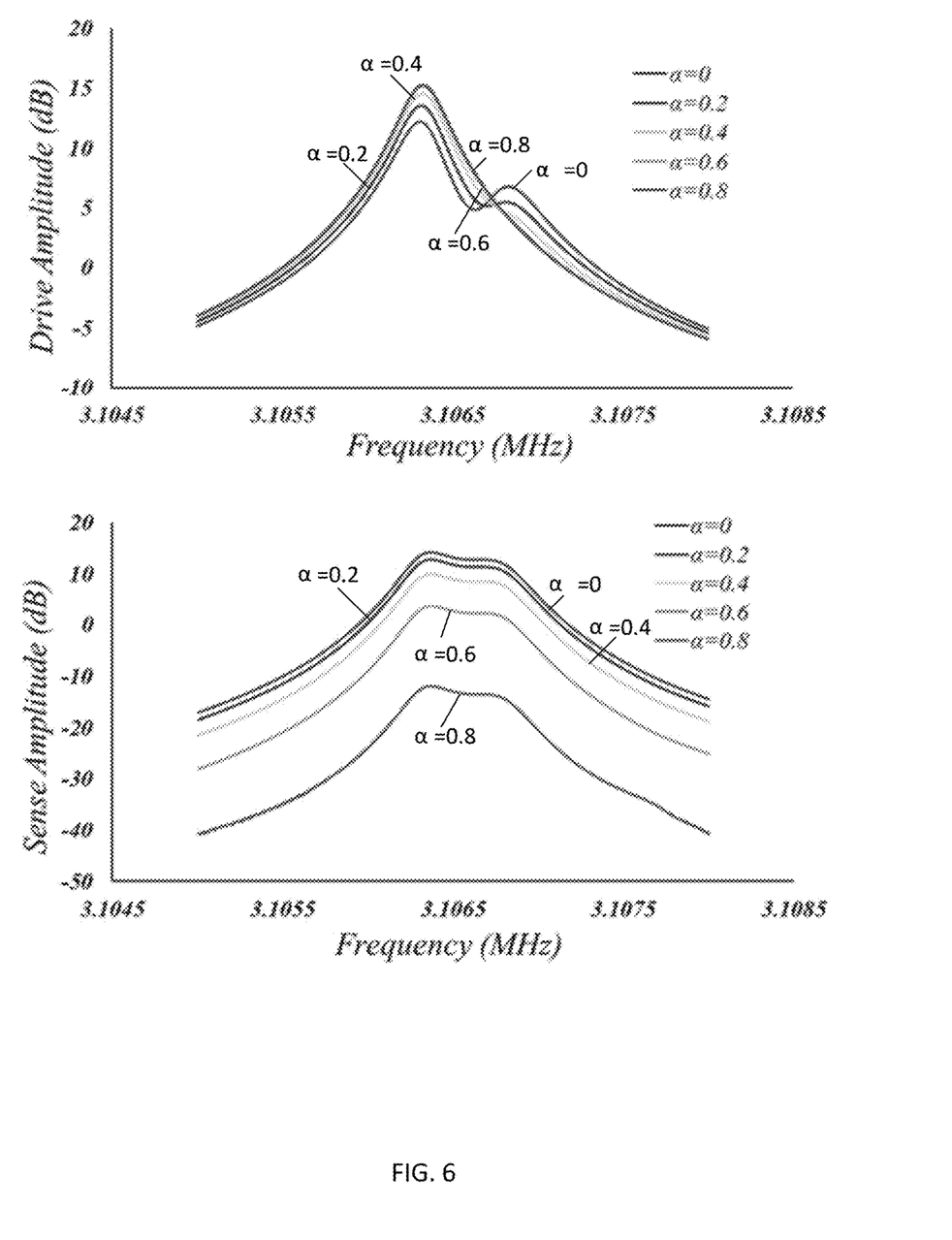
FIG. 6 is a graphical representation showing the drive and sense mode responses of the gyroscope for different levels of the weighting factor α, in accordance with one or more embodiments of the present disclosure.

Drive and sense mode response of the gyroscope for different levels of the weighting factor $\alpha$ are shown in FIG. 6. For $\alpha=0.8$, the direction of the virtual transduction electrode is closest to the eigenmode direction causing the sense-mode peak to disappear from the drive frequency response and the sense-mode response to be reduced significantly, showing the effectiveness of this method in cancelling the bias error in vibratory gyroscopes.

Figure 7:
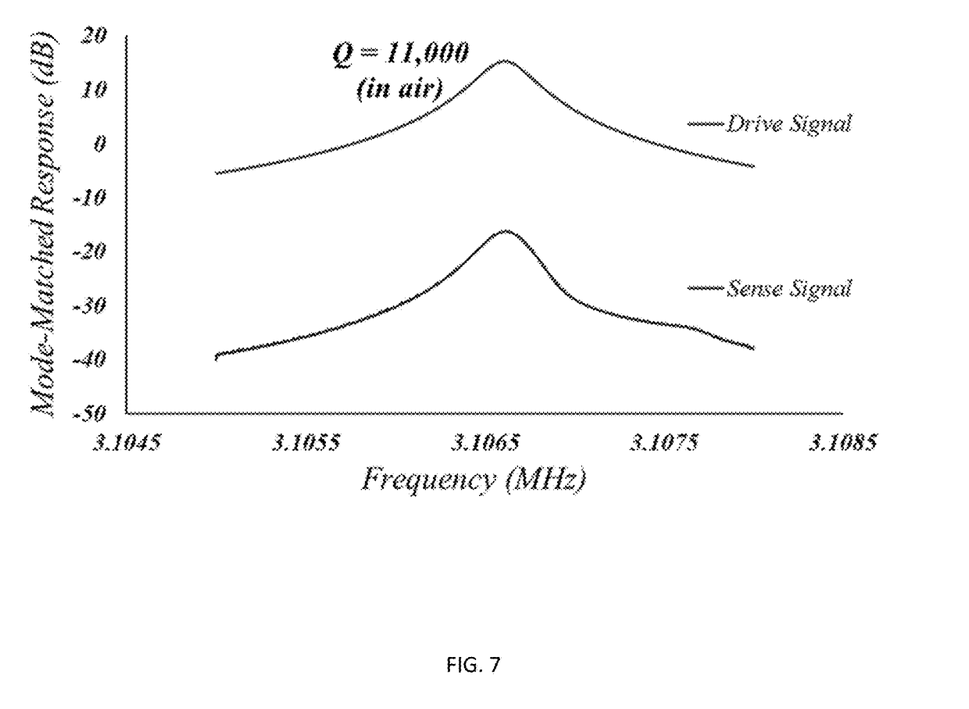
FIG. 7 is a graphical representation showing the drive and sense mode frequency responses at perfect mode-matched conditions, in accordance with one or more embodiments of the present disclosure.

Perfect mode matching, where the sense mode response is minimized and the drive and sense frequencies are equal, is achieved by iterative adjustment of the factor $\alpha$ and matching the drive and sense frequencies by adjusting the level of the displacement feedback as shown in FIG. 7.

Figure 8:
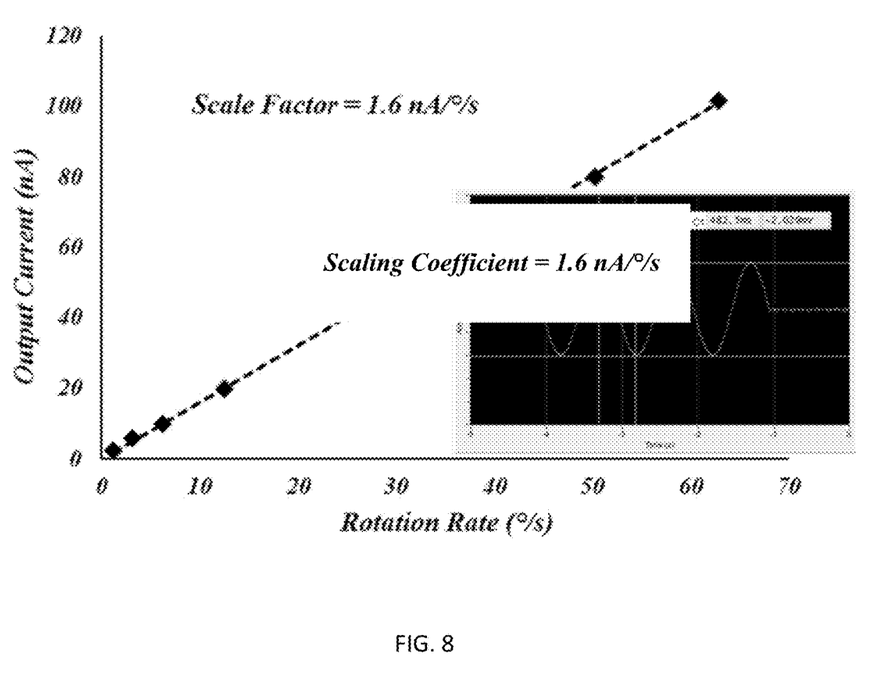
FIG. 8 is a graphical representation showing the measured Coriolis response of an annulus piezoelectric gyroscope to external rotation, in accordance with one or more embodiments of the present disclosure.
Figure 9:
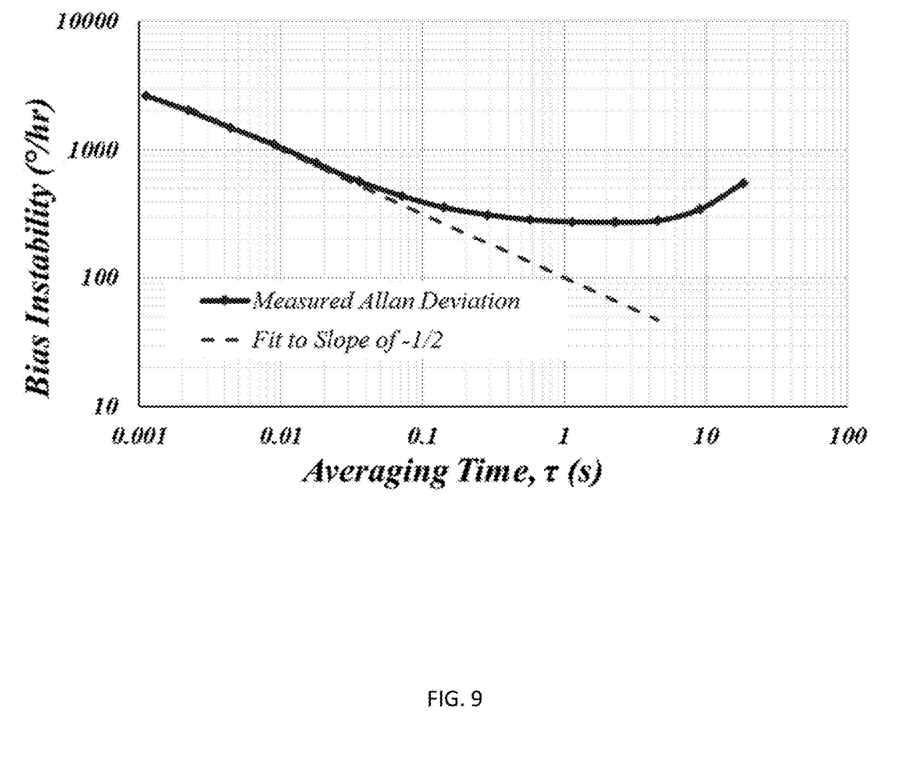
FIG. 9 is a graphical representation which shows an Allan deviation plot for an annulus piezoelectric gyroscope, in order to show the bias instability, in accordance with one or more embodiments of the present disclosure.

The Coriolis response of the annulus piezoelectric gyroscope to applied external rotation rate was measured using a rate table and a large scaling coefficient of 1.6 nA/°/s was recorded (FIG. 8). Allan deviation plot for the annulus gyroscope, showing a bias instability of 270°/hr and an ARW of 1.6°/√hr is given in FIG. 9. The bias stability of the device is limited mainly by the mismatch of analog components on the board and by the flicker noise of the DC voltages used for scaling the effective transduction of electrodes. Since the added noise in the scaling voltages $\alpha$ and $(1-\alpha)$ is up-converted by the input mixer to the resonance frequency of the gyroscope and then at the output is down-converted with the Coriolis signal, it is important to generate these signals with as little low-frequency noise as possible.

We claim:
1. A method of operating a vibratory gyroscope, the gyroscope comprising a plurality of excitation and readout electrodes, and defined by a first vibratory mode and a second vibratory mode, the method comprising:
   introducing an input signal to a first pair of excitation electrodes of the plurality of excitation and readout electrodes;
   multiplying the input signal by a first excitation scaling coefficient and a second excitation scaling coefficient to generate a first scaled input signal and a second scaled input signal;
   applying respectively the first scaled input signal and the second scaled input signal to a first excitation electrode and a second excitation electrode of the first pair of excitation electrodes;
   measuring a first output signal and a second output signal at a first pair of readout electrodes of the plurality of excitation and readout electrodes and a third output signal and a fourth output signal at a second pair of readout electrodes of the plurality of excitation and readout electrodes, the first pair of readout electrodes corresponding to the first vibratory mode and the second pair of readout electrodes corresponding to the second vibratory mode;
   multiplying the first output signal and the third output signal by a first readout scaling coefficient to form a first scaled output signal and a third scaled output signal and further multiplying the second output signal and the fourth output signal by a second readout scaling coefficient to form a second scaled output signal and a fourth scaled output signal, the sum of the first and second scaled output signals being a first vibratory mode readout signal and the sum of the third and fourth scaled output signals being a second vibratory mode readout signal; and
   adjusting the first excitation, second excitation, first readout, and second readout scaling coefficients to maximize the first vibratory mode readout signal and minimize the second vibratory mode readout signal.

2. The method of claim 1, wherein the gyroscope comprises an annulus suspended by a plurality of suspension beams, wherein the plurality of excitation and readout electrodes are disposed on the annulus.

3. The method of claim 2, further comprising a plurality of fixed electrodes disposed about a perimeter of the annulus and in communication with the plurality of excitation and readout electrodes.

4. The method of claim 1, wherein the first pair of excitation electrodes, the first pair of readout electrodes, and the second pair of readout electrodes are separated by an angle determined based on a shape of the first vibratory mode.

5. The method of claim 4, wherein the angle is from about 15 to 45 degrees.

6. The method of claim 4, wherein the angle is 22.5 degrees.

7. The method of claim 1, further comprising selecting the position of the first pair of excitation electrodes, the first pair of readout electrodes, and the second pair of readout electrodes about the gyroscope is based on a shape of the first vibratory mode and the second vibratory mode.

8. The method of claim 1, wherein the first vibratory mode and the second vibratory mode are misaligned with respect to the plurality of excitation and readout electrodes.

9. The method of claim 1, wherein the first vibratory mode and the second vibratory mode are substantially orthogonal.

10. The method of claim 1, wherein the first vibratory mode is characterized by a first vibratory frequency and the second vibratory mode is characterized by a second vibratory frequency.

11. The method of claim 1, wherein the first vibratory mode readout signal is proportional to a velocity of vibration of the gyroscope.

12. The method of claim 1, wherein the first excitation and readout scaling coefficients are approximately equal and the second excitation and readout scaling coefficients are approximately equal.

13. The method of claim 1, further comprising selecting the plurality of excitation and readout electrodes based on a crystallographic orientation of the substrate.

14. A method of operating a vibratory gyroscope, the gyroscope being in communication with a plurality of excitation electrode pairs and readout electrode pairs disposed on a vibratory body of the gyroscope and defined by a drive mode and a sense mode, the method comprising:
generating an excitation signal;
splitting the excitation signal into a first input signal and a second input signal;
multiplying the first input signal by a first excitation scaling coefficient forming a first scaled input signal and multiplying the second input signal by a second excitation scaling coefficient forming a second scaled input signal;
introducing respectively the first scaled input signal and the second scaled input signal at a first excitation electrode and a second excitation electrode of the plurality of excitation electrode pairs;
measuring a first output signal and a second output signal at a first pair of readout electrodes and a third output signal and a fourth output signal at a second pair of readout electrodes, the first pair of readout electrodes corresponding to the drive mode and the second pair of readout electrodes corresponding to the sense mode;
multiplying the first output signal and the third output signal by a first readout scaling coefficient to form a first scaled output signal and a third scaled output signal and further multiplying the second output signal and the fourth output signal by a second readout scaling coefficient to form a second scaled output signal and a fourth scaled output signal, the sum of the first and second scaled output signals being a drive mode readout signal and the sum of the third and fourth scaled output signals being a sense mode readout signal; and
adjusting the first excitation, second excitation, first readout, and second readout scaling coefficients to maximize the drive mode readout signal and minimize the sense mode readout signal.

15. The method of claim 14, wherein the gyroscope comprises an annulus suspended by a plurality of suspension beams, wherein the plurality of excitation electrode pairs and readout electrode pairs are disposed on the annulus.

16. The method of claim 14, further comprising a plurality of fixed electrodes disposed about a perimeter of the annulus and in communication with the plurality of excitation electrode pairs and readout electrode pairs.

17. The method of claim 14, wherein the drive mode is characterized by a first vibratory frequency and the sense mode is characterized by a second vibratory frequency.

18. The method of claim 14, wherein the drive readout signal is proportional to a velocity of vibration of the gyroscope.

* * * * *